(12) United States Patent
Xiong et al.

(10) Patent No.: US 10,101,833 B2
(45) Date of Patent: Oct. 16, 2018

(54) DISPLAY PANEL AND MANUFACTURING METHOD THEREFOR, AND DISPLAY DEVICE

(71) Applicants: Shanghai Tianma AM-OLED Co., Ltd., Shanghai (CN); Tianma Micro-Electronics Co., Ltd., Shenzhen (CN)

(72) Inventors: Zhiyong Xiong, Shanghai (CN); Yongcai Shen, Shanghai (CN); Dong Qian, Shanghai (CN)

(73) Assignees: SHANGHAI TIANMA AM-OLED CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 655 days.

(21) Appl. No.: 14/668,783

(22) Filed: Mar. 25, 2015

(65) Prior Publication Data

US 2016/0147342 A1    May 26, 2016

(30) Foreign Application Priority Data

Nov. 21, 2014  (CN) .......................... 2014 1 0674550

(51) Int. Cl.
  *G06F 3/041*  (2006.01)
  *H05B 33/10*  (2006.01)
  *G06F 3/044*  (2006.01)
(52) U.S. Cl.
  CPC ............ *G06F 3/0412* (2013.01); *G06F 3/044* (2013.01); *H05B 33/10* (2013.01); *G06F 2203/04103* (2013.01)

(58) Field of Classification Search
  CPC ............... G06F 3/044; G06F 3/0412; G06F 2203/04103; H05B 33/10
  (Continued)

(56) References Cited

U.S. PATENT DOCUMENTS

| 2011/0050604 A1 | 3/2011 | Kwon et al. |
| 2011/0234509 A1 | 9/2011 | Lee et al. |

(Continued)

FOREIGN PATENT DOCUMENTS

| CN | 1649456 A | 8/2005 |
| CN | 102386210 A | 3/2012 |

(Continued)

*Primary Examiner* — Michael Pervan
(74) *Attorney, Agent, or Firm* — Faegre Baker Daniels LLP

(57) ABSTRACT

The present disclosure provides a display panel and a manufacturing method therefor, and a display device, and the display panel includes a first substrate and a second substrate disposed opposite to the first substrate; an organic light emitting layer disposed between the first substrate and the second substrate, wherein the organic light emitting layer includes a planar cathode layer; a planar cathode protection layer disposed on the cathode layer; and a first touch layer disposed on the cathode protection layer. With the technical solutions according to the present disclosure, the first touch layer is formed by evaporation processes just like the organic light emitting layer, so that the manufacture steps of the display panel are reduced as compared to forming the first touch layer by a photo etching process. Further, if the evaporation mask instead of the photo etching masks is used during the manufacture, the production cost is reduced.

9 Claims, 10 Drawing Sheets

(58) Field of Classification Search
USPC .................. 178/18.01–19.07; 345/173–178
See application file for complete search history.

(56) References Cited

U.S. PATENT DOCUMENTS

| | | | | |
|---|---|---|---|---|
| 2012/0097512 A1* | 4/2012 | Choi | ................... | G06F 3/0412 |
| | | | | 200/5 A |
| 2012/0169636 A1* | 7/2012 | Liu | ................... | G06F 3/0412 |
| | | | | 345/173 |
| 2012/0249454 A1* | 10/2012 | Teraguchi | ............ | G06F 3/0412 |
| | | | | 345/173 |
| 2012/0268402 A1 | 10/2012 | Wang et al. | | |

FOREIGN PATENT DOCUMENTS

| | | | |
|---|---|---|---|
| CN | 102681709 | A | 9/2012 |
| CN | 102738199 | A | 10/2012 |
| CN | 102955636 | A | 3/2013 |
| CN | 103325341 | A | 9/2013 |
| CN | 103440847 | A | 12/2013 |
| CN | 103842947 | A | 6/2014 |
| CN | 103926729 | A | 7/2014 |
| WO | 2007146780 | A2 | 12/2007 |

\* cited by examiner

DISPLAY PANEL AND MANUFACTURING METHOD THEREFOR, AND DISPLAY DEVICE

CROSS-REFERENCE TO RELATED APPLICATION

This application claims priority to Chinese Application No. 201410674550.1, filed on Nov. 21, 2014, which is herein incorporated by reference in its entirety.

TECHNICAL FIELD

The present disclosure relates to a field of display technologies, and in particular to a display panel and a manufacturing method therefor, and a display device.

BACKGROUND

An Active Matrix Organic Light Emitting Diode (AMOLED) possesses a lot of advantageous characteristics, such as self-luminosity, low power consumption, relatively high reacting speed, high contrast ratio and wide viewing angle, therefore the application prospect of the AMOLED is wide in the field of display technologies.

With the development of the display technologies, a touch structure is integrated into an AMOLED display panel to implement a touch function. In the related art, in order to enable the touch function in the AMOLED display panel, a touch structure is integrated with an AMOLED display structure in an On-Cell manner. However, the manufacture of the AMOLED display panel made by such integration involves many steps and causes a high cost.

SUMMARY

In a first aspect, embodiments of the present disclosure provide a display panel including:
- a first substrate and a second substrate disposed opposite to the first substrate;
- an organic light emitting layer disposed between the first substrate and the second substrate, where the organic light emitting layer comprises a planar cathode layer;
- a planar cathode protection layer which is disposed on the cathode layer; and
- a first touch layer disposed on the cathode protection layer.

In a second aspect, embodiments of the present disclosure provide a display device including the display panel described in the first aspect.

In a third aspect, embodiments of the present disclosure provide a manufacturing method for a display panel, which includes the following steps:
- providing a first substrate and a second substrate;
- forming an organic light emitting layer on the second substrate, wherein the organic light emitting layer comprises a cathode layer having a planar shape;
- forming a cathode protection layer which is planar on the cathode layer; forming a first touch layer on the cathode protection layer;
- arranging the first substrate and the second substrate to be opposite to each other and sealing the first substrate and the second substrate.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

With the detailed non-limiting embodiments described below with reference to accompanying drawings, other features, purposes and advantages of the present disclosure will become more apparent.

Figure 1A:
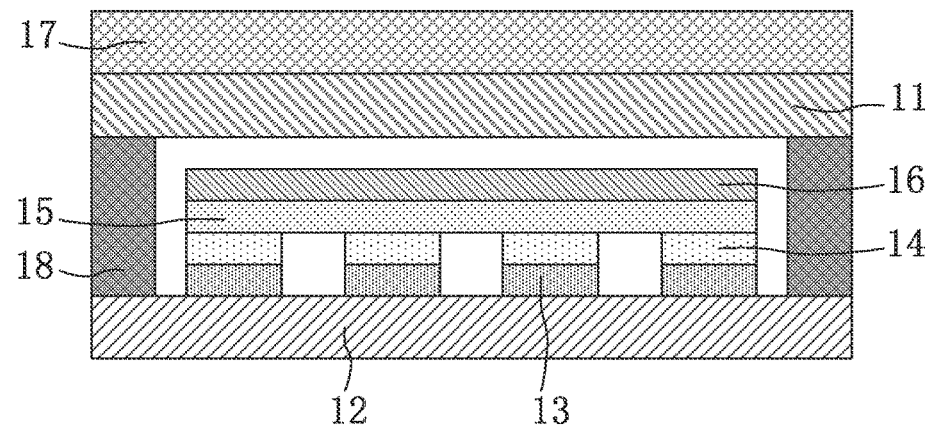
FIG. 1A is a schematic diagram showing a structure of an AMOLED display panel in the related art.

While the disclosure is amenable to various modifications and alternative forms, specific embodiments have been shown by way of example in the drawings and are described in detail below. The intention, however, is not to limit the disclosure to the embodiments described. On the contrary, the disclosure is intended to cover all modifications, equivalents, and alternatives falling within the scope of the disclosure as defined by the appended claims.

DETAILED DESCRIPTION

The present disclosure will be described below further in detail with reference to the accompanying drawings and the embodiments. It is appreciated that the specific embodiments described herein are merely used to explain the present disclosure, rather than limiting the present disclosure. It is further noted that, in order not to obscure the description, merely a part of rather than all of the disclosure is shown in the accompanying drawings.

With the development of display technologies, there is a need for integrating a touch structure into an AMOLED display panel to implement a touch function. In the related art, the touch structure is integrated with the AMOLED display structure in an On-Cell manner to implement the touch function of the AMOLED display panel.

FIG. 1A is a schematic diagram showing a structure of an AMOLED display panel in the related art. As shown in FIG. 1A, an AMOLED display panel includes: a first substrate 11; a second substrate 12 disposed opposite to the first substrate 11; an anode 13, a light emitting layer 14, a planar cathode layer 15 and a planar cathode protection layer 16, which are sequentially disposed on the second substrate 12 and between the first substrate 11 and the second substrate 12; and a touch structure 17 disposed on the first substrate 11. The first substrate 11 and the second substrate 12 are bonded together by a border adhesive 18 and construct an AMOLED display structure together with the anode 13, the light emitting layer 14, the planar cathode layer 15 and the planar cathode protection layer 16, which are disposed between the first and second substrates. In FIG. 1A, the touch structure 17 is integrated with the AMOLED display structure in an On-Cell manner, and the touch structure 17 at lease includes two touch layers, which may be located in different layers or the same layer and be electrically insulated from each other.

Figure 1B:
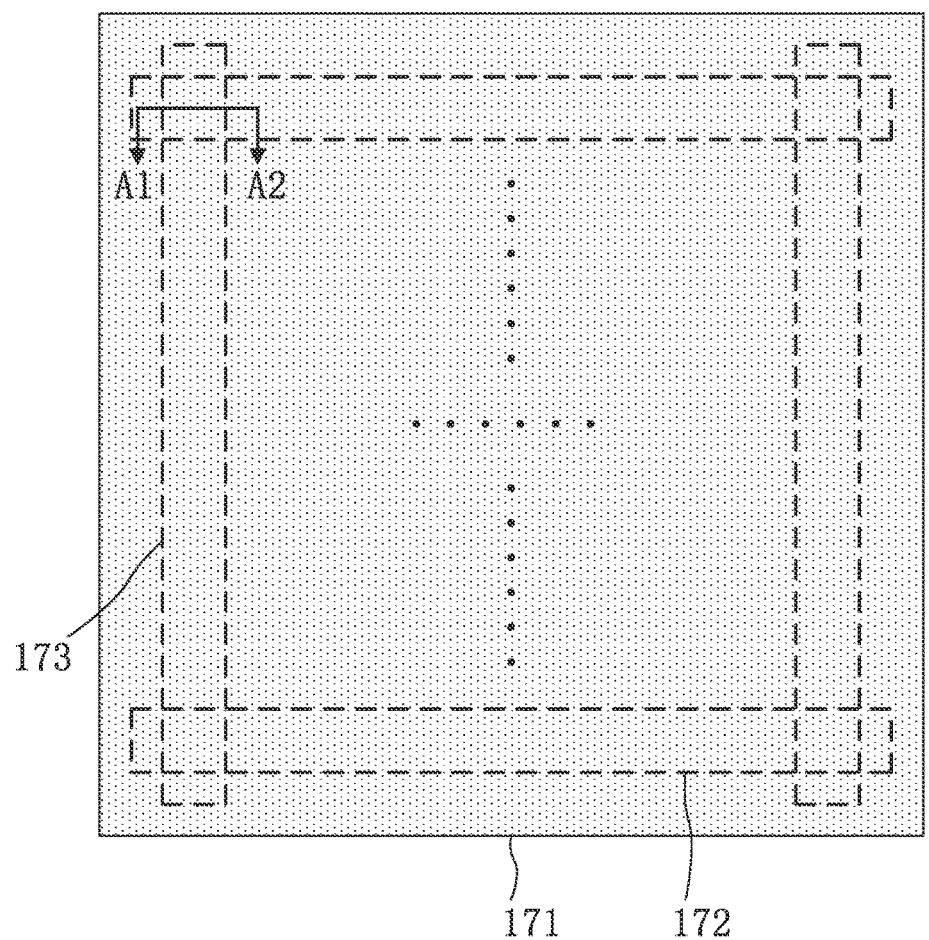
FIG. 1B is a top view showing a touch structure disposed on a first substrate shown in FIG. 1A.

FIG. 1B is a top view showing a touch structure disposed on the first substrate in FIG. 1A. As shown in FIG. 1B, the touch structure includes a first passivation layer 171, a first touch layer formed by a plurality of first touch electrodes 172 and a second touch layer formed by a plurality of second touch electrodes 173, where the first touch layer and the second touch layer are both located below the first passivation layer 171, and the first touch electrodes 172 intersect and are electrically insulated from the second touch electrodes 173.

Figure 1C:
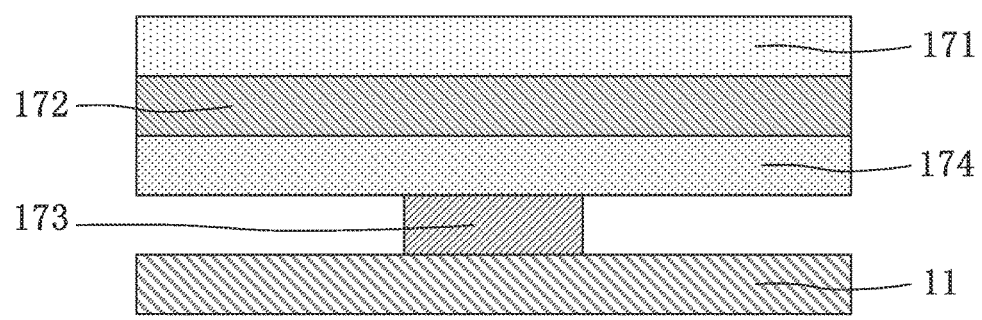
FIG. 1C is a schematic sectional diagram of the touch structure, which is taken along A1-A2 in FIG. 1B.
Figure 1D:
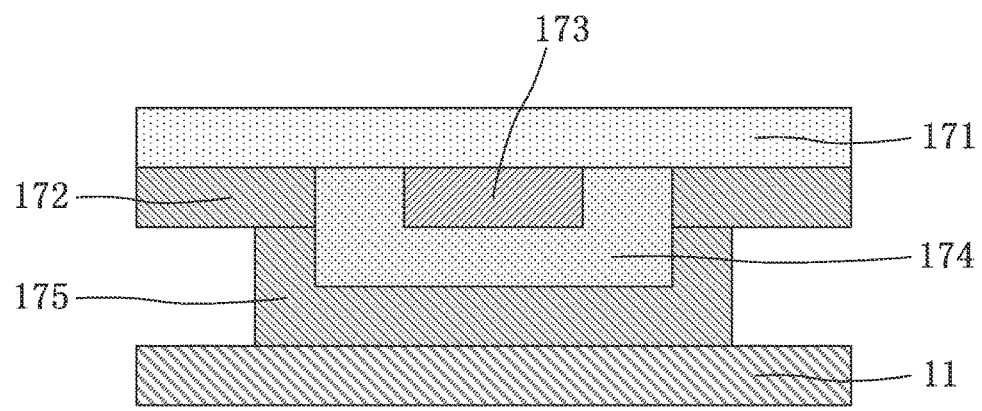
FIG. 1D is another schematic sectional diagram of the touch structure, which is taken along A1-A2 in FIG. 1B.

The first touch electrodes 172 and the second touch electrodes 173 may be located in different layers, as illustrated in FIG. 1C, where, the touch structure disposed on the first substrate 11 includes a second touch layer formed by a plurality of second touch electrodes 173, a second passivation layer 174, a first touch layer formed by a plurality of first touch electrodes 172 and a first passivation layer 171 which are arranged in sequence, where the first touch electrodes 172 are electrically insulated from the second touch electrodes 173 by the second passivation layer 174. Alternatively, the first touch electrodes 172 and the second touch electrodes 173 may be located in the same layer, as shown in FIG. 1D. As a difference from FIG. 1C, FIG. 1D shows that the first touch electrodes 172 and the second touch electrodes 173 are located in the same layer, as such, the touch layer constructed by the first touch electrodes 172 and that constructed by the second touch electrodes 173 are located in the same layer. The first touch electrodes 172 may be electrically connected through bridge connections 175 at intersections between the first touch electrodes 172 and the second touch electrodes 173.

The touch structures 17 as illustrated in both FIG. 1C and FIG. 1D may be formed by photo etching processes. The manufacturing of these touch structures includes many processing steps of forming films, applying adhesives, exposing, developing, etching and stripping; further, the manufacturing cost is high because a photo etching mask is required for each of the processing steps.

Figure 2:
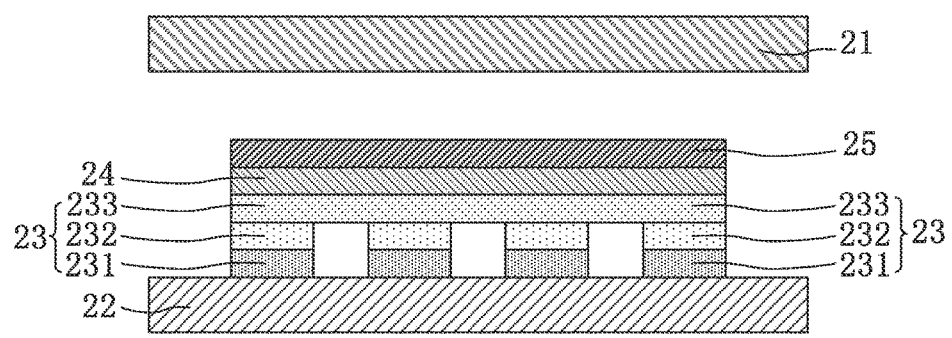
FIG. 2 is a schematic diagram showing a structure of a display panel, according to embodiments of the present disclosure.

In view of the above, a technical solution is provided according to embodiments of the present disclosure. A display panel is provided and FIG. 2 is a schematic diagram showing a structure of the display panel according to embodiments of the present disclosure. As illustrated in FIG. 2, the display panel includes: a first substrate 21; a second substrate 22 disposed opposite to the first substrate 21; an organic light emitting layer 23 disposed between the first substrate 21 and the second substrate 22. The organic light emitting layer 23 includes a planar cathode layer 233; a planar cathode protection layer 24 disposed on the cathode layer 233; and a first touch layer 25 disposed on the cathode protection layer 24.

It is noted that an upward direction refers to a direction from the second substrate 22 to the organic light emitting layer 23 and a downward direction refers to a direction opposite to the upward direction. The words "above" and "under" as recited herein are merely used to describe positions, without limiting particular structures.

The first touch layer 25 for a touch function is arranged on the cathode protection layer which is disposed between the first substrate 21 and the second substrate 22, i.e. the first touch layer 25 is arranged in a display panel in an In-Cell manner, thus the first touch layer 25 may be formed by evaporation processes just like the organic light emitting layer 23 during the manufacture. As described above, the first touch layer is formed by the photo etching processes in the related art, and the photo etching processes include processing steps of forming films, applying adhesives, exposing, developing, etching and stripping. However, the first touch layer is formed by evaporation processes according to technical solutions of the present disclosure, where the corresponding evaporation processes merely include a processing step of evaporation. Thus, as compared to the related art, the steps for manufacturing the display panel according to the technical solution of the present disclosure are reduced, and the production cost is reduced by using a evaporation mask instead of the photo etching masks as in the related art during the manufacture.

It is noted that even though the organic light emitting layer 23, the cathode protection layer 24 and the first touch layer 25 are sequentially formed in technical solutions of the present disclosure, the first touch layer 25, the organic light emitting layer 23 and the cathode protection layer 24 are independent of each other and individually perform their respective functions, i.e. the first touch layer 25 is configured for a touch function of the display panel, the organic light emitting layer 23 is configured for the displaying function of the display panel, and the cathode protection layer 24 is configured to protect the organic light emitting layer 23 and to electrically insulate the organic light emitting layer 23 from the first touch layer 25.

As illustrated in FIG. 2, the organic light emitting layer 23 also includes an anode 231 and a light emitting layer 232 in addition to the planar cathode layer 233. The anode 231 is disposed on one side, which is facing to the first substrate 21, of the second substrate 22, and the light emitting layer 232 is disposed between the anode 231 and the cathode layer 233. When the display panel is powered, electron holes in the anode 231 move toward the light emitting layer 232, and electric charges in the cathode layer 233 also move toward the light emitting layer 232 and are bonded with the electron holes in the light emitting layer 232 to emit lights, which may be such as red, green or blue depending on different material of the light emitting layer 232 to construct primary colors for implementing a displaying function. It is noted that the organic light emitting layer may be formed with a top emission structure or a bottom emission structure, which is not limited herein. If the top emission structure is utilized in the organic light emitting layer, the anode is made of reflective material and the cathode layer is made of transparent material or translucent material; if the bottom emission structure is utilized in the organic light emitting layer, the cathode layer is made of reflective material and the anode is made of transparent material or translucent material.

In order to implement the displaying function of the display panel, the display panel also includes a second touch layer provided to cooperate with the first touch layer, and the second touch layer may be disposed on one side of the first substrate. It is noted that due to the configuration of both the first touch layer and the second touch layer, if a touch driving function is implemented by the first touch layer, the touch sensing function is implemented by the second touch layer, and vice versa.

Figure 3A:
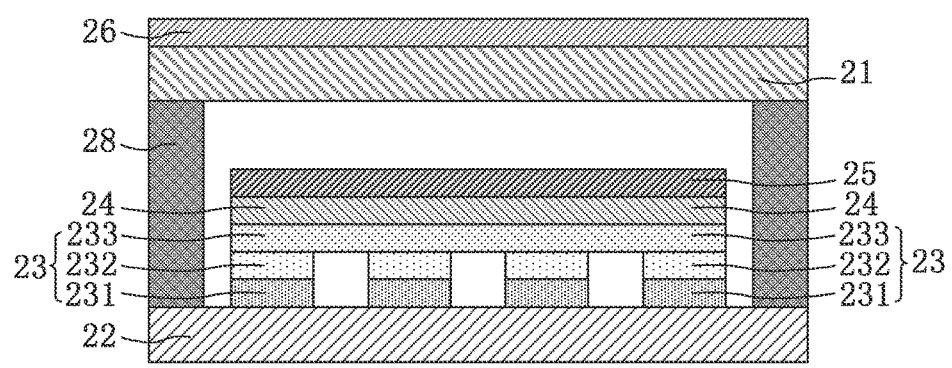
FIG. 3A is a schematic diagram showing another structure of a display panel, according to embodiments of the present disclosure.

As illustrated in FIG. 3A, based on the display panel as shown in FIG. 2, the display panel also includes a second touch layer 26 on one side, which is away from the second substrate 22, of the first substrate 21, i.e. the second touch layer 26 is arranged in the display panel in an On-Cell manner. The second touch layer 26 may be directly formed on the first substrate 21, or the second touch layer 26 may be formed and then externally attached to the first substrate 21. Then the first substrate 21 on which the second touch layer 26 is formed may be bonded with the second substrate 22 on which the organic light emitting layer 23 and the first touch layer 25 are formed through border adhesives 28.

Figure 3B:
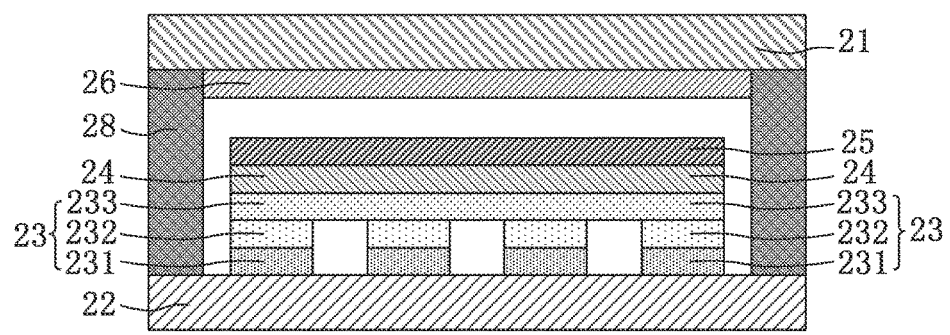
FIG. 3B is a schematic diagram showing still another structure of a display panel, according to embodiments of the present disclosure.

As a difference from FIG. 3A, FIG. 3B shows that a second touch layer 26 is provided on one side, which is facing to the second substrate 22, of the first substrate 21; and the second touch layer 26 is electrically insulated from the first touch layer 25, i.e. the second touch layer 26 is arranged in the display panel in an In-Cell manner. Given that the structures of the first touch layer 25 and the second touch layer 26 remain unchanged, as compared with the display panel shown in FIG. 3A, the distance between the first touch layer 25 and the second touch layer 26 is reduced in the display panel shown in FIG. 3B, and hence the touch effect of the display panel as shown in FIG. 3B is better than that of the display panel as shown in FIG. 3A.

Figure 3C:
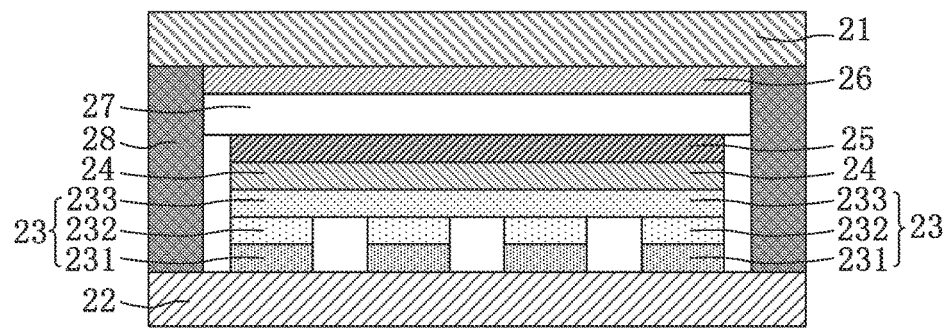
FIG. 3C is a schematic diagram showing still another structure of a display panel, according to embodiments of the present disclosure.

In order for a better touch effect of the display panel as shown in FIG. 3B, a first insulating layer 27 is provided between the first touch layer 25 and the second touch layer 26 as illustrated in FIG. 3C. Because a dielectric constant of the first insulating layer 27 is higher than that of the air, the capacitance between the first touch layer 25 and the second touch layer 26 is increased, thereby improving the touch effect of the display panel. Additionally, as compared with the air, the first touch layer 27 may accomplish better electrical insulation between the first touch layer 25 and the second touch layer 26.

Next, embodiments of the first touch layer and the second touch layer according to the above technical solutions of the present disclosure are given below.

Figure 4A:
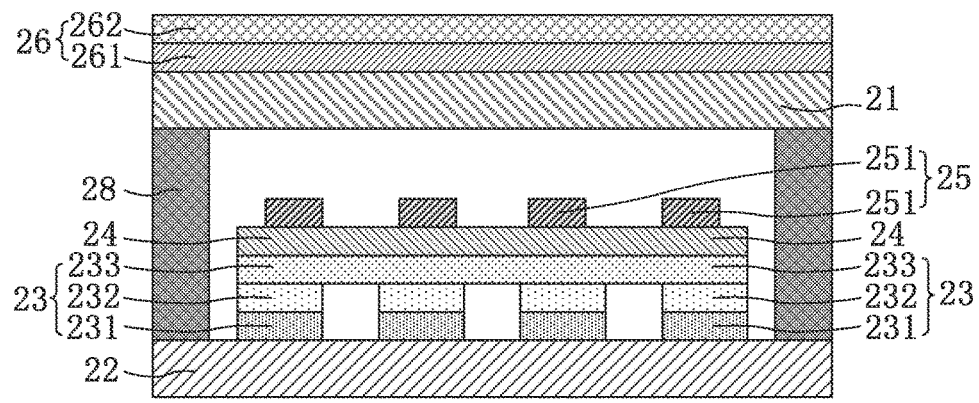
FIG. 4A is a schematic diagram showing still another structure of a display panel, according to embodiments of the present disclosure.
Figure 4B:
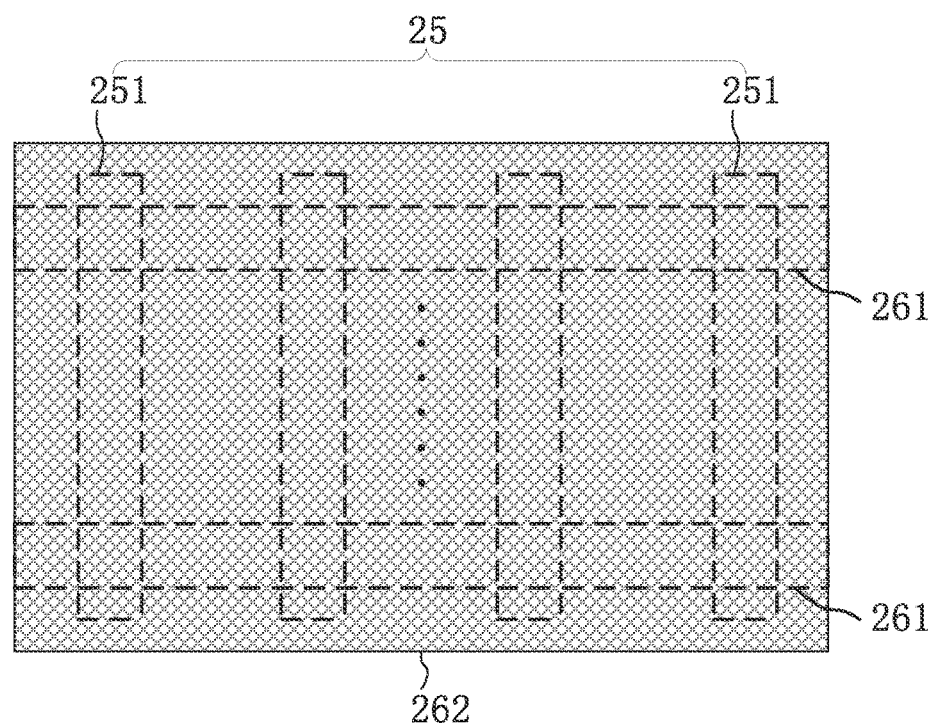
FIG. 4B is a top view showing structures of a first touch layer and a second touch layer in FIG. 4A.

As illustrated in FIG. 4A, corresponding to the display panel as shown in FIG. 3A, the first touch layer 25 includes a plurality of first touch electrodes 251, the second touch layer 26 includes a plurality of second touch electrodes 261 and a first passivation layer 262 located on the second touch electrodes 261, and the first passivation layer 262 is configured to protect the second touch electrodes 261. FIG. 4B is a top view showing structures of the first touch layer and the second touch layer in FIG. 4A. As illustrated in FIG. 4B, the first touch electrodes 251 vertically intersect the second touch electrodes 261, and the first passivation layer 262 has a planar shape and completely covers the second touch electrodes 261, for better protection for the second touch electrodes 261.

Figure 4C:
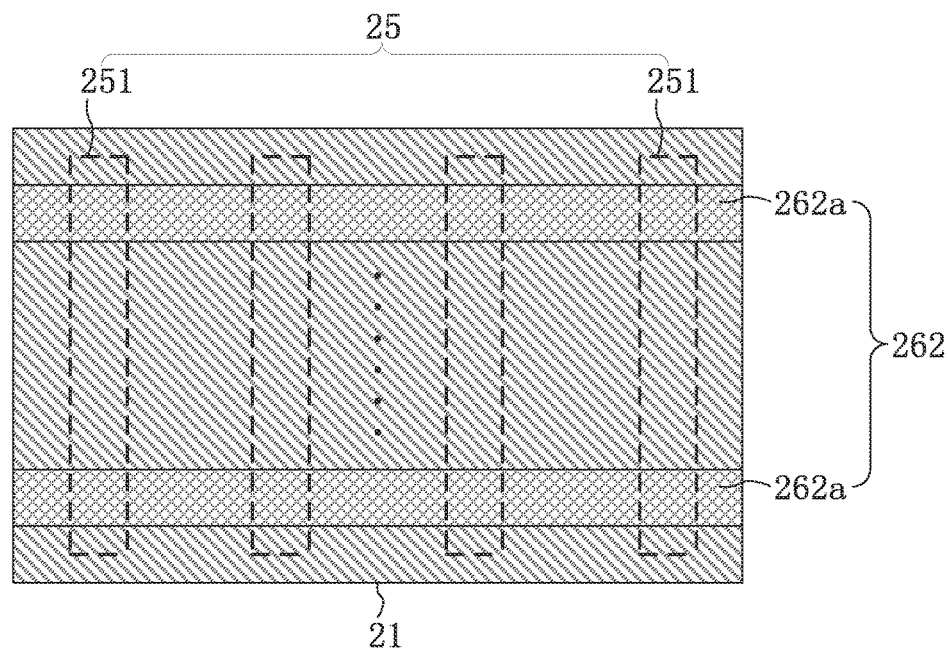
FIG. 4C is a top view showing other structures of the first touch layer and the second touch layer in FIG. 4A.

FIG. 4C is a top view showing other structures of the first touch layer and the second touch layer in FIG. 4A. As a difference from FIG. 4B, FIG. 4C shows that the first passivation layer 262 includes a plurality of first passivation layer structures 262a disposed on the second touch electrodes 261 and each of the first passivation layer structures 262a covers one of the first touch electrodes 261. As compared with the display panel shown in FIG. 4B, the first passivation layer 262 (formed by the first passivation layer structures 262a) and the second passivation layer 261 in FIG. 4C may be formed by the photo etching processes using only one photo etching mask, which may further reduce the processing steps and the production cost.

Figure 5A:
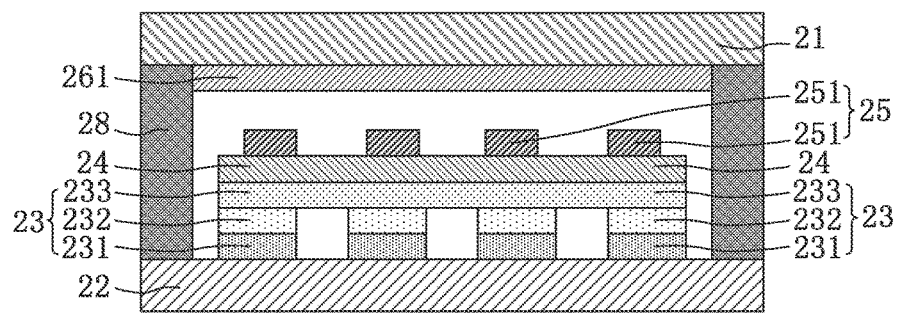
FIG. 5A is a schematic diagram showing still another structure of a display panel, according to embodiments of the present disclosure.
Figure 5B:
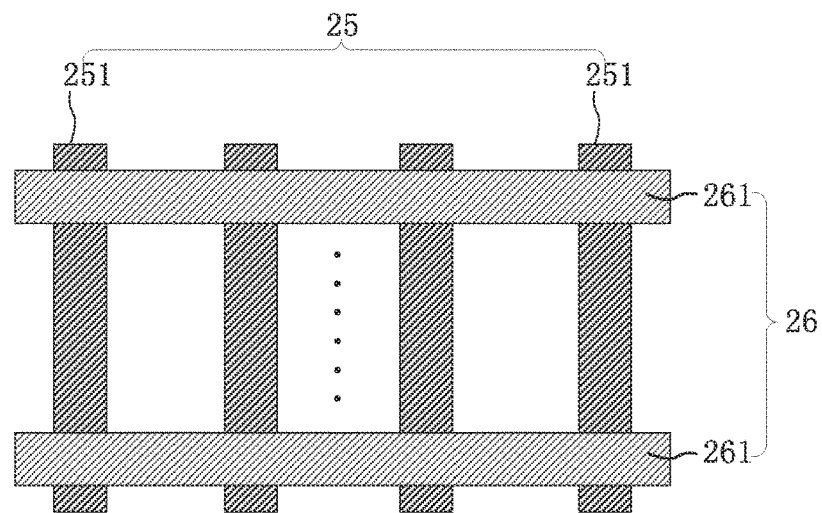
FIG. 5B is a top view showing structures of a first touch layer and a second touch layer in FIG. 5A.

As illustrated in FIG. 5A, corresponding to the display panel shown in FIG. 3B, the first touch layer 25 includes a plurality of touch electrodes 251, and the second touch layer 26 includes a plurality of second touch electrodes 261. FIG. 5B is a top view showing structures of the first touch layer and the second touch layer in FIG. 5A. As illustrated in FIG. 5B, the first touch electrodes 251 vertically intersect the second touch electrodes 261.

The structures of the first touch layer 25 and the second touch layer 26 corresponding to the display panel shown in FIG. 3C are similar to structures as shown in FIG. 5A and FIG. 5B, and reference may be made to FIGS. 5A and 5B and the related description.

It is noted that even though the first touch electrodes 251 vertically intersect the second touch electrodes 261 as shown in FIGS. 4B, 4C and 5B, the first touch electrodes 251 may also non-vertically intersect the second touch electrodes 261, which is not limited herein as long as the touch function is implemented by the first touch electrodes 251 and the second touch electrodes 261.

In the above technical solutions, the first substrate 21 may be Cover Lens or Cover Glass, and the second substrate 22 may be an array substrate.

In the above technical solutions, the first touch electrodes in the first touch layer and the second touch electrodes in the second touch layer may be made of metal material or transparent conductive material, and the transparent conductive material may be one or any combination of Indium Tin Oxide (ITO), Indium Zinc Oxide (IZO) and Indium Gallium Zinc Oxide (IGZO). The first touch electrodes in the first touch layer are preferably made of metal material. Because the wire resistance of the metal processed by evaporation processes is smaller than that of the transparent conductive material, the touch effect of the first touch layer made of the metal is better.

In the above technical solutions, because the cathode layer has a planar structure and the first touch layer is provided on the cathode protection layer, the first touch layer and the cathode layer are overlapping with each other, and a coupling parasitic capacitance is produced between the first touch layer and the cathode layer. If a displaying state and a touch state of the display panel are present concurrently, the produced coupling parasitic capacitance may cause electromagnetic interference to the displaying state and the touch state, thereby disturbing the displaying effect and touch effect of the display panel.

Figure 6:
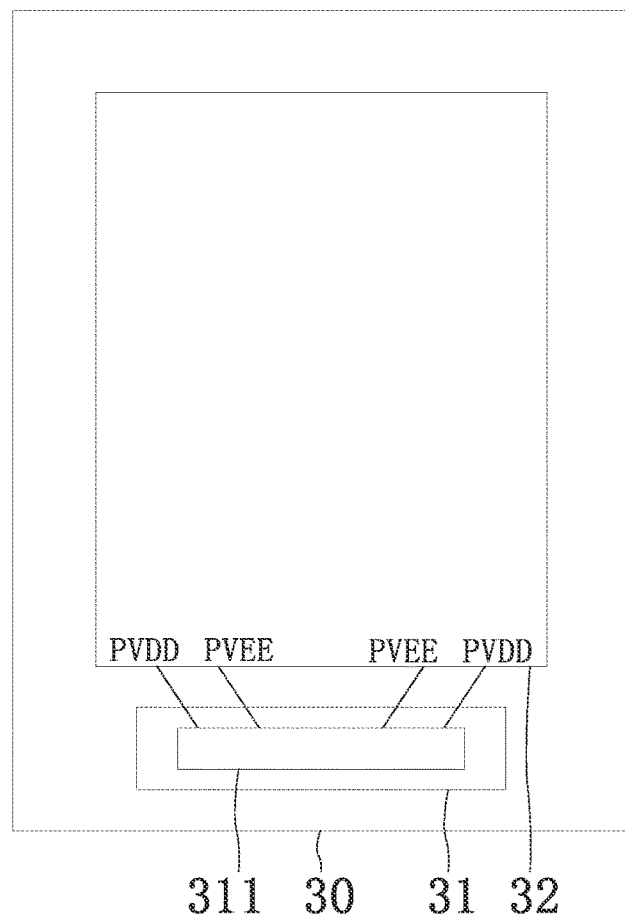
FIG. 6 is a schematic diagram showing still another structure of a display panel, according to embodiments of the present disclosure.

In order to avoid the above-described electromagnetic interference, preferably, the touch state and the displaying state are present in a time division manner (i.e. alternately) in the display panel according to technical solutions in the present disclosure, thus, as illustrated in FIG. 6, a display panel 30 includes an integrated circuit (IC) 31 provided in a stepped area, and the integrated circuit 31 includes a time division control unit 311. After at least one image frame is displayed by the display panel 30, the time division control unit controls to cut off a power path for the organic light emitting layer so that the display panel 30 quits the displaying state and enters into the touch state. The display panel 30 may be any one of above display panels. In FIG. 6, a first touch layer and an organic light emitting layer are provided within a displaying area 32 of the display panel 30, where the organic light emitting layer is powered on by a positive power resource PVDD to emit lights, and a negative power resource PVEE is configured to form a current loop. The time division control unit 311 in the integrated circuit 31 controls the displaying state of the display panel 30 by cutting off or connecting the power path of the positive power resource PVDD provided to the organic light emitting layer, thereby presenting the displaying state and the touch state of the display panel in the time division manner.

Particularly, cutting off or connecting the power path of the positive power resource PVDD provided to the organic light emitting layer by the time division control unit 311 may be implemented through controlling the time division control unit 311 by touch driving signals. For example, after at least one image frame is displayed by the display panel, touch driving signals are provided to detect whether the display panel is touched, at this time, the time division control unit 311 is controlled by the touch driving signals to cut off a power path of the positive power source PVDD provided to the organic light emitting layer so that the display panel quits the displaying state and enters into the touch state. The touch driving signals stop after lasting for a certain time period (which may be set as desired by configuring the display panel), at this time, the time division control unit 311 connects the power path of the positive power resource PVDD provided to the organic light emitting layer without the control of the touch driving signals, so that the display panel quits the touch state and enters again into the displaying state. As described above, the touch driving signals are adopted in order for that the time division control unit controls to cut off or connect the power path of the positive power resource PVDD provided to the organic light emitting layer, so that the display panel presents the displaying state and touch state in the time division manner. This is merely an illustrative control manner, and other control manners may be applied to the present disclosure to enable the time division control unit to control the cutting off or connecting of the power path of the positive power resource PVDD provided to the organic light emitting layer, without departing from the scope of the disclosure.

It is noted that the time division control unit may be arranged in an integrated control circuit as above, or in a driving circuit or a control circuit on the display panel. For example, the time division control unit is arranged in a pixel driving circuit or in a scanning driving circuit as long as the displaying state and the touch state may be presented by the display panel in the time division manner.

Figure 7:
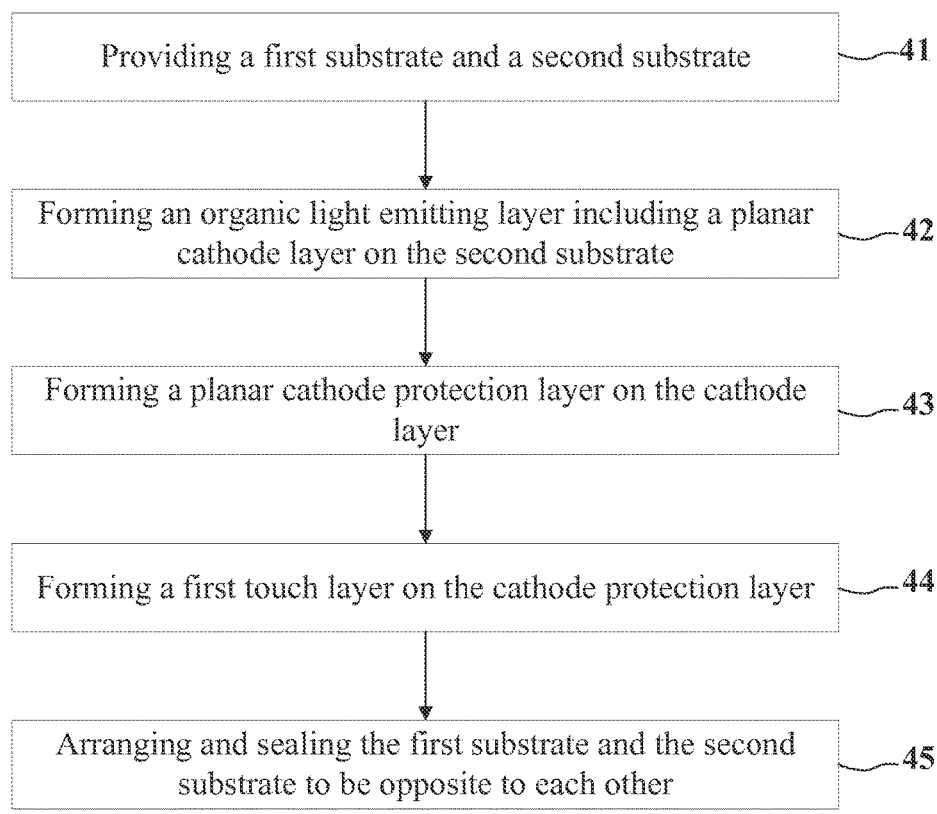
FIG. 7 is a flow chart of a manufacturing method for a display panel, according to embodiments of the present disclosure.

A manufacturing method for a display panel is also provided according to embodiments of the present disclosure. FIG. 7 is a flow chart of a manufacturing method for a display panel according to embodiments of the present disclosure. As illustrated in FIG. 7, the manufacture method for a display panel includes Steps 41 to 45 below.

At Step 41, a first substrate and a second substrate are provided.

At Step 42, an organic light emitting layer including a planar cathode layer is formed on the second substrate.

At Step 43, a planar cathode protection layer is formed on the cathode layer.

At Step 44, a first touch layer is formed on the cathode protection layer.

At Step 45, the first substrate and the second substrate are arranged to be opposite to each other and sealed.

At Step 45, in arranging the first substrate opposite to the second substrate, one side of the second substrate, which is provided with the organic light emitting layer, the cathode protection layer and the first touch layer, is arranged to face to the first substrate, in this way, after the first substrate and the second substrate are sealed, the organic light emitting layer, the cathode protection layer and the first touch layer are located in a box structure formed by the sealed first and second substrates.

It is noted that the order of the above Steps 41 to 45 may be changed depending on actual manufacture processes, thus the order of these steps is not limited.

Particularly, the touch function of the first touch layer formed at Step 44 may be implemented by forming corresponding touch electrodes.

In some embodiments, the organic light emitting layer also includes an anode and a light emitting layer, where the anode is formed on one side, which is facing to the first substrate, of the substrate, and the light emitting layer is formed between the anode and the cathode layer. For the operation principles of the organic light emitting layer, reference may be made to the description of the above display panel, which will not be repeated hereinafter.

In some embodiments, the organic light emitting layer and the first touch layer are both preferably formed by using a fine metal mask. Compared with forming the first touch layer by using the photo etching masks and the photo etching processes, the processing steps of the manufacture of the display panel in the technical solution of the present disclosure are reduced and the production cost is reduced.

With the above steps, the first touch layer for the touch function is disposed on the cathode protection layer between the first substrate and the second substrate, and the first touch layer may be formed by evaporation processes just like the organic light emitting layer. Compared with forming the first touch layer by photo etching processes, the first touch layer is formed by evaporation processes in technical solutions of the present disclosure, thereby reducing the processing steps of manufacture of the display panel, further, as compared with using the photo etching masks in the photo etching process, using the evaporation masks during the manufacture in the present disclosure may reduce the production cost.

Figure 8:
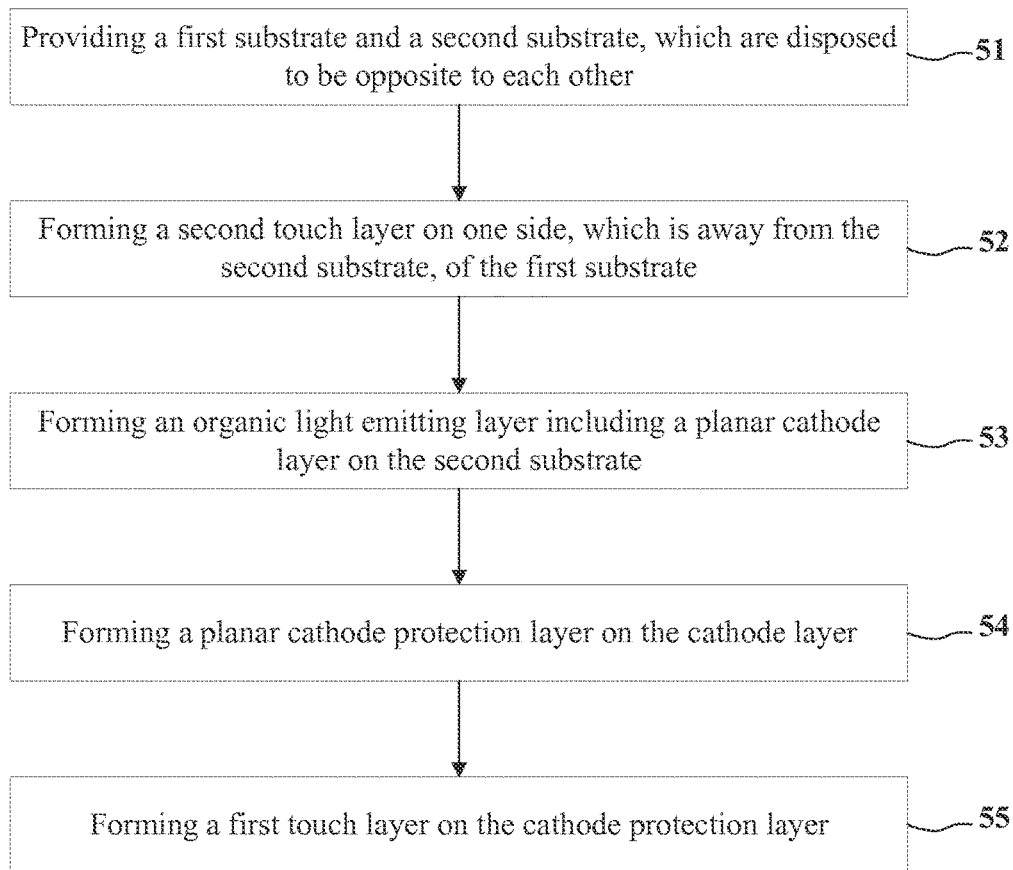
FIG. 8 is a flow chart of another manufacturing method for a display panel, according to embodiments of the present disclosure.

In order to implement the touch function of the display panel, the display panel also includes a second touch layer provided to cooperate with the first touch layer, and the second touch layer may be provided on one side of the first substrate. It is noted that due to the configuration of both the first touch layer and the second touch layer, if the touch driving function is implemented by the first touch layer, the touch sensing function is implemented by the second touch layer, and vice versa. Based on the above, as illustrated in FIG. 8, the corresponding manufacture method of the display panel including the second touch layer includes Steps 51 to 55 below.

At Step 51, a first substrate and a second substrate disposed opposite to the first substrate are provided.

At Step 52, a second touch layer is formed on one side, which is away from the second substrate, of the first substrate.

At Step 53, an organic light emitting layer including a planar cathode layer is formed between the first substrate and the second substrate.

At Step 54, a planar cathode protection layer is formed on the cathode layer.

At Step 55, a first touch layer is formed on the cathode protection layer.

It is noted that the order of the above Steps 51 to 55 may be changed depending on actual manufacture processes, thus the order of these steps is not limited.

In some embodiments, the first touch layer includes a plurality of first touch electrodes, the second touch layer includes a plurality of second touch electrodes, and the first touch electrodes are arranged to intersect the second touch electrodes. That is, the first touch electrodes and the second touch electrodes intersect with each other, to implement the touch function by the first touch layer and the second touch layer.

It is noted that the first touch electrodes may vertically intersect the second touch electrodes, or the first touch electrodes may non-vertically intersect the second touch electrodes.

Furthermore, the second touch layer obtained at Step 52 may also include a first passivation layer formed on the second touch electrodes.

Furthermore, the first passivation layer formed on the second touch control electrodes has a planar shape, or the first passivation layer includes a plurality of first passivation layer structures formed on the second touch electrodes. In the case of the planar first passivation layer which can completely cover the second touch electrodes, the second touch electrodes can be better protected; in the case of the first passivation layer constructed by the plurality of first passivation layer structures formed on the second touch electrodes, the first passivation layer (formed by the first passivation layer structures) and the second touch electrodes may be made through photo etching processes by using the same photo etching mask, thereby reducing the processing steps and the production cost.

Besides the above Step 52 of forming the second touch layer on one side, which is away from the second substrate, of the first substrate, the forming of the second touch layer may alternatively include:

Step 52' of forming a second touch layer on one side, which is facing to the second substrate, of the first substrate, where the second touch layer is electrically insulated from the first touch layer.

It is noted that the second touch layer is arranged in the display panel in an On-Cell manner at Step 52, and the second touch layer is arranged in the display panel in an In-Cell manner at Step 52' in place of Step 52. Because a distance between the first touch layer and the second touch layer formed by Step 52' in the display panel is small than a distance between the first touch layer and the second touch layer formed by Step 52 in the display panel, thus the displaying effect of the display panel with the second touch layer formed by Step 52' is better than the displaying effect of the display panel with the second touch layer formed by Step 52.

In order to improve the displaying effect of the display panel, corresponding to the second touch layer obtained at Step 52', the corresponding manufacture method of the display panel also includes: disposing a first insulating layer between the first touch layer and the second touch layer.

Because a dielectric constant of the first insulating layer is higher than that of the air, the capacitance between the first touch layer and the second touch layer is increased, thereby improving the touch effect of the display panel. Additionally, as compared with the air, the first touch layer may accomplish better electrical insulation between the first touch layer and the second touch layer.

It is noted that in either the display panel including the second touch layer formed by Step 52' or the display panel including the first passivation layer, the first touch layer in the display panel may include a plurality of first touch electrodes, the second touch layer may include a plurality of second touch electrodes, and the first touch electrodes intersect the second touch electrodes. That is, by intersecting the first touch electrodes with the second touch electrodes, a corresponding touch function may be implemented by the first touch layer and the second touch layer.

Figure 9:
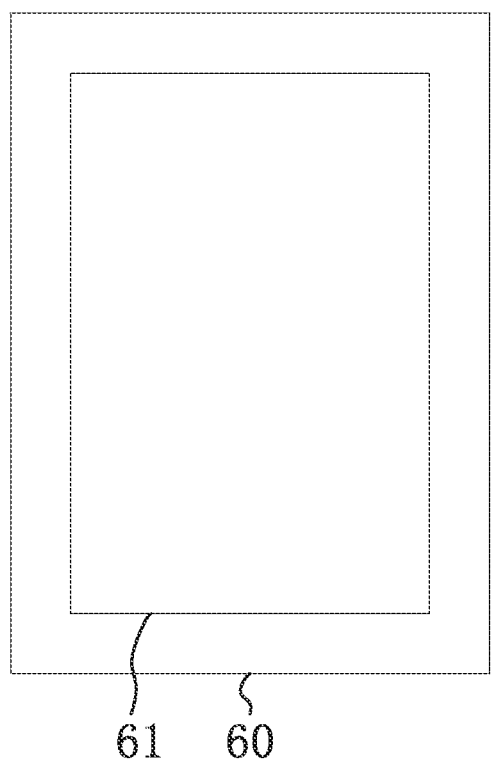
FIG. 9 is a schematic diagram showing a structure of a display device, according to embodiments of the present disclosure.

A display device is further provided according to embodiments of the present disclosure. FIG. 9 is a schematic diagram showing a structure of a display device according to embodiments of the present disclosure. As illustrated in FIG. 9, a display device 60 includes a display panel 61, and may also include other members for supporting the normal operation of the display panel 61. The display panel 61 may be any one of the display panels in the above embodiments. The display device 60 may be a cell phone, a tablet PC, electric paper, a digital photo frame or the like.

With the display panel and the manufacturing method therefor as well as the display device according to embodiments of the present disclosure, the first touch layer for a touch function is disposed on the cathode protection layer which is disposed between the first substrate and the second substrate, and the first touch layer is formed by evaporation processes just like the organic light emitting layer during the manufacture, so that the manufacture steps of the display panel are reduced as compared to forming the first touch layer by a photo etching process. Further, the evaporation mask instead of the photo etching masks is used during the manufacture, the production cost is reduced.

It is noted that the embodiments and the technology principles of the present disclosure described as above are merely illustrative. It should be understood for those skilled in the art that the present disclosure is not limited to the particular embodiments described herein. Various apparent changes, readjustment and alternatives can be made by those skilled in the art without departing from the scope of the present disclosure. Therefore, although the present disclosure is illustrated in detail through the above embodiments, the present disclosure is not merely limited to the above embodiments, and can further include other equivalent embodiments without departing from the concept of the present disclosure. The scope of the present disclosure is subject to the appended claims.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A display panel comprising:
   a first substrate and a second substrate disposed opposite to the first substrate;

an organic light emitting layer disposed between the first substrate and the second substrate, wherein the organic light emitting layer comprises a planar cathode layer, a plurality of anodes, and a light emitting layer;

a planar cathode protection layer disposed on the cathode layer;

a first touch layer disposed on the cathode protection layer; and a second touch layer disposed on one side, which is away from the second substrate, of the first substrate, wherein the first touch layer comprises a plurality of first touch electrodes, and a projection of each of the plurality of first touch electrodes on the second substrate is overlapped with a projection of a respective one of the plurality of anodes on the second substrate, wherein the second touch layer comprises a plurality of second touch electrodes, and the plurality of first touch electrodes intersect the plurality of second touch electrodes, and wherein the second touch layer further comprises a first passivation layer disposed on the second touch electrodes, the first passivation layer comprises a plurality of first passivation layer structures disposed on the plurality of second touch electrodes and each of the plurality of first passivation layer structures covers a respective one of the plurality of second touch electrodes.

2. The display panel of claim 1, wherein a touch state and a displaying state are presented in the display panel in a time division manner.

3. The display panel of claim 2, wherein the display panel further comprises an integrated control circuit, which comprises a time division control unit; and the time division control unit is configured to control cutting off of a power path for the organic light emitting layer after at least one image frame is displayed by the display panel, so that the display panel quits the displaying state and enters into the touch state.

4. The display panel of claim 1, wherein a displaying state and a touch state of the display panel are present concurrently.

5. The display panel of claim 1, wherein the plurality of first passivation layer structures intersect the plurality of first touch electrodes.

6. The display panel of claim 1, wherein the light emitting layer is discontinuous and comprises a plurality of discrete light emitting blocks, and each of the plurality of light emitting blocks is sandwiched between the planar cathode layer and a respective one of the plurality of anodes.

7. A display device comprising a display panel, wherein the display panel comprises:

a first substrate and a second substrate disposed opposite to the first substrate;

an organic light emitting layer disposed between the first substrate and the second substrate, wherein the organic light emitting layer comprises a planar cathode layer, a plurality of anodes and a light emitting layer;

a planar cathode protection layer disposed on the cathode layer;

a first touch layer disposed on the cathode protection layer; and a second touch layer disposed on one side, which is away from the second substrate, of the first substrate, wherein the first touch layer comprises a plurality of first touch electrodes, and a projection of each of the plurality of first touch electrodes on the second substrate is overlapped with a projection of a respective one of the plurality of anodes on the second substrate, wherein the second touch layer comprises a plurality of second touch electrodes, and the plurality of first touch electrodes intersect the plurality of second touch electrodes, and wherein the second touch layer further comprises a first passivation layer disposed on the second touch electrodes, the first passivation layer comprises a plurality of first passivation layer structures disposed on the plurality of second touch electrodes and each of the plurality of first passivation layer structures covers a respective one of the plurality of second touch electrodes.

8. A manufacturing method for a display panel comprising:

providing a first substrate and a second substrate;

forming an organic light emitting layer on the second substrate, wherein the organic light emitting layer comprises a cathode layer having a planar shape, a plurality of anodes and a light emitting layer;

forming a planar cathode protection layer on the cathode layer;

forming a first touch layer on the cathode protection layer;

forming a second touch layer on one side, which is away from the second substrate, of the first substrate; and arranging the first substrate and the second substrate to be opposite to each other and sealing the first substrate and the second substrate, wherein the first touch layer comprises a plurality of first touch electrodes, and a projection of each of the plurality of first touch electrodes on the second substrate is overlapped with a projection of a respective one of the plurality of anodes on the second substrate, wherein the second touch layer comprises a plurality of second touch electrodes, and the plurality of first touch electrodes intersect the plurality of second touch electrodes, and wherein the manufacturing method further comprises:

forming a first passivation layer on the second touch electrodes and etching the first passivation layer to form a plurality of first passivation layer structures, wherein each of the plurality of first passivation layer structures covers a respective one of the plurality of second touch electrodes.

9. The manufacturing method of claim 8, wherein the plurality of first passivation layer structures and the plurality of second touch electrodes are formed by a same photo etching mask.

* * * * *